Oct. 26, 1954
R. E. HAYES
2,692,520
TOGGLE-OPERATED PIPE HOLDER HAVING JAWS
SHIFTABLE AROUND CLAMPING AXIS
Filed Nov. 29, 1951
2 Sheets-Sheet 2
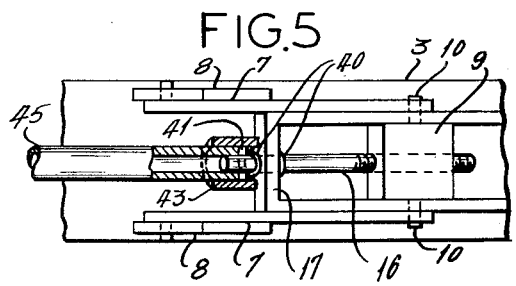
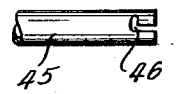
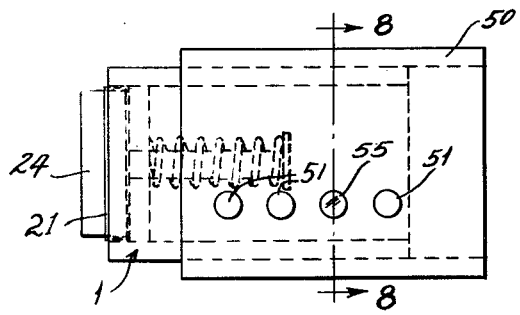
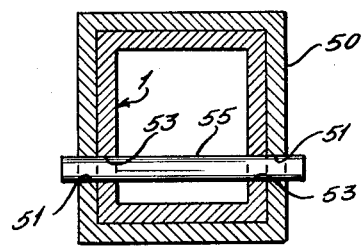
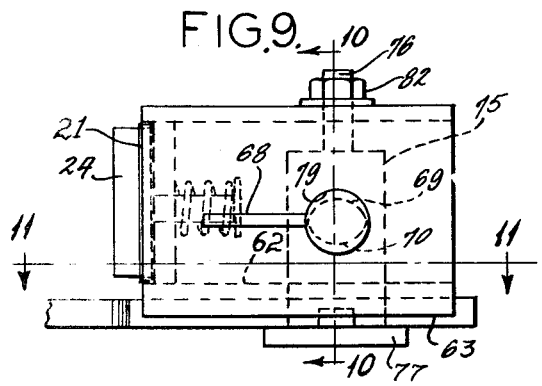
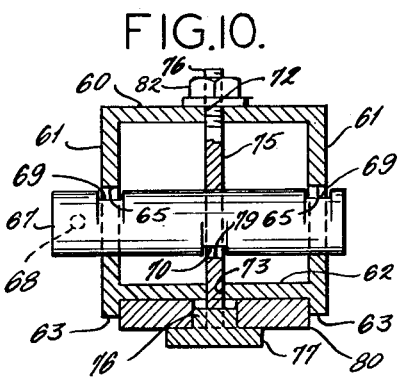
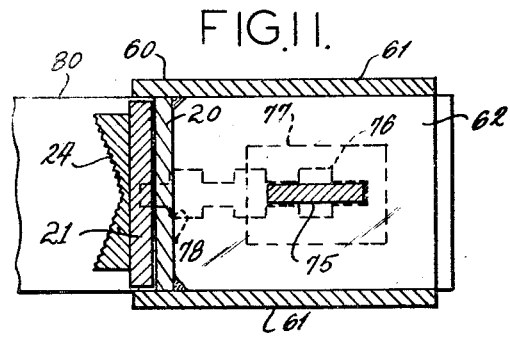
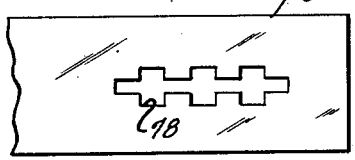
INVENTOR:
RUSH E. HAYES
By Brunings and Sutherland
ATTORNEYS Patented Oct. 26, 1954

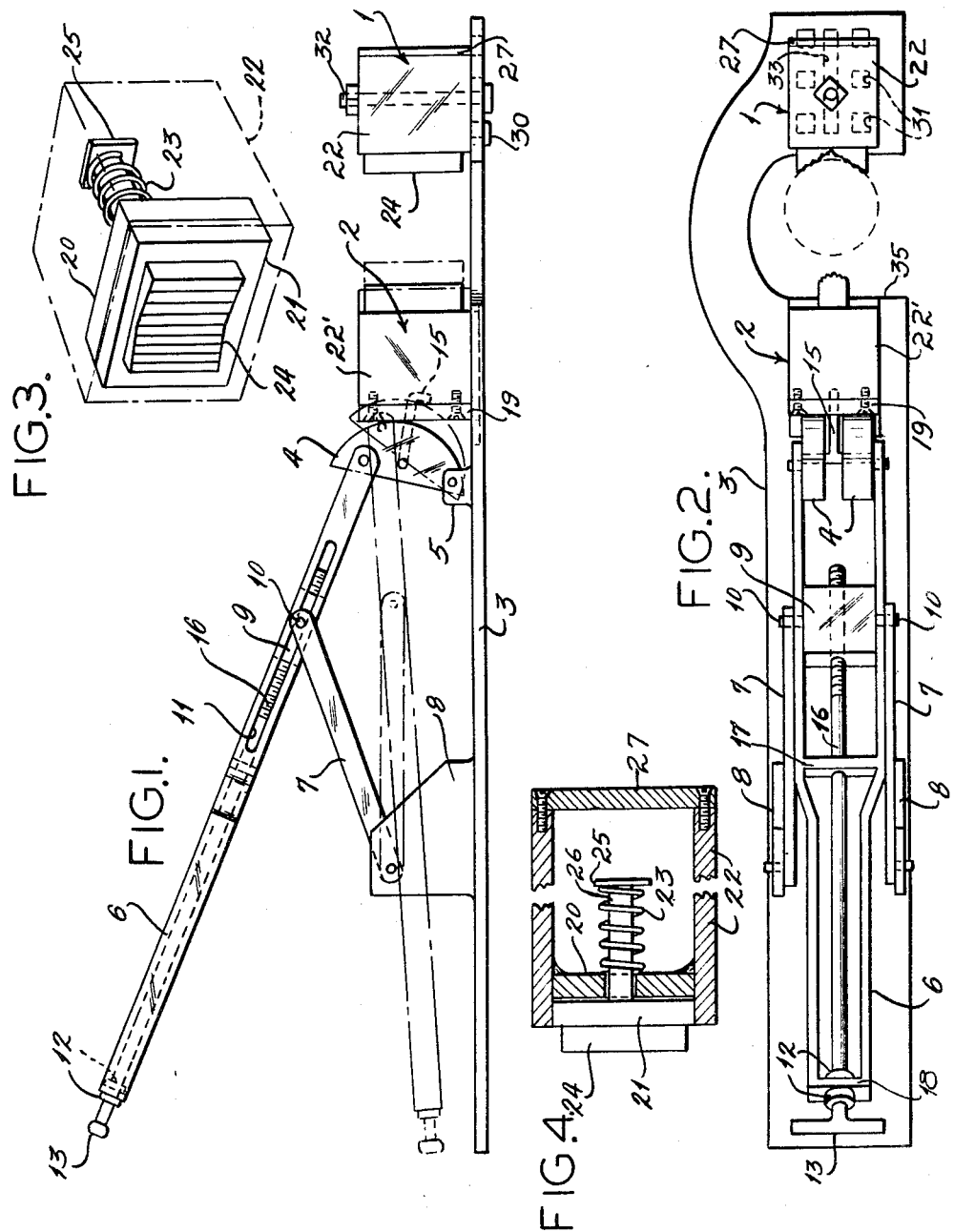

2,692,520

UNITED STATES PATENT OFFICE 2,692,520

TOGGLE-OPERATED PIPE HOLDER HAVING JAWS SHIFTABLE AROUND CLAMPING AXIS

Rush E. Hayes, Willow Hill, Ill.; Charles M. Hayes, administrator of the estate of said Rush E. Hayes, deceased Application November 29, 1951, Serial No. 258,912

6 Claims. (Cl. 81—17)

This invention relates to pipe holders and has particular application in the well-drilling art, to holders for drill stems or casings.

In the well-drilling art it is important that a pipe holder maintain a grip which will hold the pipe (as the term is used herein to indicate ordinary pipe, well casings, drill stems, rods and the like) securely against slippage, that the pipe holder be quick acting both to clamp and release the pipe and that it be easily positioned around the pipe.

One of the objects of this invention is to provide a pipe holder which is simple, effective against slippage, quick acting and readily adjustable.

Another object is to provide such a pipe holder with a positively retracted jaw.

Another object is to provide such a pipe holder with improved jaws which allow the holder to be used with pipe in a horizontal or vertical position.

Other objects will become apparent to those skilled in the art in the light of the following description and accompanying drawing.

In accordance with this invention generally stated a pipe holder is provided having a stationary jaw block and a movable jaw block. The movable jaw block is actuated by a cam which in turn is operated by a toggle, one pivot point of which is adjustable to vary the throw of the movable jaw block. The toggle is so arranged as to pass over its center, when the movable jaw block reaches its point of greatest throw, to lock that jaw block in position. The cam is provided with a retracting bar to retract the movable jaw positively when the toggle is operated to relieve the pressure of the cam on the movable jaw block.

The jaw blocks are so constructed as to allow the jaws to be rotated to various discrete positions easily and quickly without tools, but in any one position the jaws are fixed against accidental rotation.

The stationary jaw block is so constructed and arranged as to be coarsely adjustable as compared with the movable jaw block, to adapt the pipe holder to a wide variety of pipe sizes.

In the drawing:

Figure 1 is a view in side elevation of a pipe holder constructed in accordance with this invention;

Figure 2 is a plan view of the device shown in Figure 1;

Figure 3 is a view in perspective of one embodiment of jaw showing the arrangement whereby it can be rotated;

Figure 4 is a sectional view of a jaw block and jaw of the type shown in Figure 3;

Figure 5 is a plan view partly cut away showing another form of handle assembly for use with this invention;

Figure 6 is a detail view in side elevation of one end of the handle shown in Figure 5;

Figure 7 is a view in side elevation showing one form of jaw block housing for use with the invention;

Figure 8 is a sectional view taken along the line 8—8 of Figure 7;

Figure 9 is a view in side elevation of another embodiment of jaw block housing and jaw block locking arrangement for use with the invention;

Figure 10 is a sectional view taken along the line 10—10 of Figure 9;

Figure 11 is a sectional view taken along the line 11—11 of Figure 9; and

Figure 12 is a plan view of one end of a base plate adapted for use with the jaw block lock of Figures 9–11.

Referring now to the drawings for an illustrative embodiment of this invention, the pipe holder shown in Figures 1 and 2 is provided with a fixed jaw block 1 and a movable jaw block 2, mounted on a base plate 3. The fixed jaw block 1 is provided with L-shaped lugs 30 taking into holes 31 in the base plate 3. A bolt 32 extending through a slot 33 in the base plate 3 and through the jaw block 1 completes the securing of the jaw block 1 to the base plate. A housing 22' of the movable jaw 2 slides in a channel in the base 3, which serves as a guide and which may be formed in any suitable manner. The base plate 3 is provided with a U-shaped opening 35 between the fixed jaw 1 and the movable jaw 2 to admit pipe as indicated in Figure 2.

In the embodiment shown in Figures 1 and 2 the mechanism which operates the movable jaw consists of a pair of semi-circular cams 4 pivoted on lugs 5 on the base 3 at their lower ends and pivoted at their upper ends on a yoke 6. A pair of links 7 which complete a toggle are pivoted at their lower ends on ears 8 on the base 3 and at their upper ends on the yoke 6. The links 7 are pivoted on the yoke 6 by means of a pair of studs 10 mounted on a sliding pivot block 9 and extending through a pair of slots 11 in the yoke 6. The pivot block 9 is tapped to take a threaded rod 16. The threaded rod 16 is journalled in cross bars 17 and 18 of the yoke 6. At the cross bar 18, which forms one end of the yoke 6, the rod is provided with a collar 12 secured to the rod on either side of the cross bar 18 to prevent axial movement of the rod. A handle 13 is provided at the end of the rod 16.

The cams 4 carry a retracting bar 15. The retracting bar 15 is T-shaped in plan view and L-shaped in side elevation. The depending leg of the L engages the inner surface of a back plate 19 of the movable jaw block 2 and the bar extends through a slot in that back plate 19 in such a way that the leg of the bar does not pull through. The transverse piece of the retracting bar is journalled at each end in one of the cams at a point near the center of curvature of the cams.

In the jaw block shown in Figures 3 and 4, a jaw 24 may be rotated in increments of 90° through any desired angle. This block consists of an open ended square housing 22, in which is welded a plate 20 having a hole in its center. A second plate 21 which is dimensioned to fit closely but not tightly within the square housing 22 carries the jaw 24. A rod 26 projects from the center of the plate 21 through and revolvably within the hole in the plate 20, and inside the housing 22. A spring 23 surrounds the rod 26. One end of the spring 23 engages the inside surface of the plate 20 while the other end engages a stop 25 carried by the end of the rod 26. A back plate 27 serves to complete the closing of the housing 22.

In the operation of the pipe holder, assume that the yoke 6 is in its raised position as shown in the solid lines of Figure 1 and in Figure 2. The lowering of the yoke 6 toward the position shown in broken lines in Figure 1 moves the cams 4 around their pivots on lugs 5 and against the movable jaw block 2 to slide that jaw block forward toward the fixed jaw block 1. As the yoke 6 moves past center, the cams 4 will be retracted very slightly and any pressure from the movable jaw against the cams 4 will tend to maintain the yoke in its lowered, below center, position. If it is found desirable, a stop may be provided beyond which the yoke cannot be lowered. The retraction will be very small for two reasons. First, the toggle need be only slightly below center, at which point the maximum purchase and minimum movement is obtained, and second, the arrangement of the cams is such as to produce a progressively diminishing forward motion as the clamping position is approached. A very stable and powerful clamping action is thus provided. It can be seen that the thrust of the jaw block is taken almost entirely by the ears 8 and lugs 5.

When the yoke 6 is moved from its lower position to its upper position the cams 4 are swung back around their pivots, the depending leg of the retracting bar 15 engages the inside surface of the back plate 19 and the movable jaw 2 is positively retracted from its clamping position.

A rough adjustment of the pipe holder to various sizes of pipe is made with fixed jaw block 1 by removing the bolt 32, inserting the L-shaped lugs 30 in the desired holes replacing the bolt 32, and tightening the bolt. It can be seen that other securing means may be used and when the preferred type jaw block such as that shown in Figures 3 and 4 is used the bolt 32 must be so placed as not to interfere with the rod 26 and stop 25 of the jaw plate 21.

Often the outside diameter of a standard size pipe or rod will vary by small amounts. In order to be able quickly and easily to provide for such variations the slidable pivot block 9, operated by the threaded rod 16, is used. By rotating the handle 13 so that the pivot block 9 is moved toward the cams 4 the cams are moved away from the movable jaw block 2 so that the jaw block 2 is not thrown as far toward the fixed jaw block 1 when the yoke is lowered to clamping position. By turning the handle 13 in the opposite direction, to move the pivot block 9 away from the cams 4, the distance between the studs 10 and the upper pivot point of the cam is increased, the cams are moved toward the movable jaw block 2 which is accordingly moved closer to the fixed jaw block 1 in clamping position. Thus by a turn or two of the handle 13, small variations in the size of the pipe to be held may be accommodated. In practice, sufficient adjustment can be made by means of the sliding pivot block 9 to accommodate various different sizes of pipe within a range of plus or minus ½ to ¾ inch as well as to accommodate variations in the diameter of pipe of a single size. While a greater range of adjustment by means of the sliding pivot block can be accomplished by making the threaded portion of the rod 16, and the slots 11, longer and by making the cams 4 larger or changing their shape, it is generally entirely satisfactory to accomplish major adjustments by moving the fixed jaw block and to use the sliding pivot block for fine adjustment as has been described.

In clamping a piece of pipe, the yoke is raised, the pipe is positioned between the jaws (or the holder positioned around the pipe) and the yoke is lowered part way. The handle 13 is then turned until both jaws touch the pipe, and the yoke is pushed down to clamping position. The amount of clamping pressure exerted in this method of use depends upon how far the yoke is lowered before the jaws meet the pipe. Of course, if the pipe diameter is uniform, no subsequent adjusting is necessary and the yoke may simply be lowered to clamping position.

The shape of the cam faces and the positions of the pivot points on the cam will determine the purchase obtainable, and the amount of travel and rate of travel available with a given toggle arrangement. For example, by moving the upper cam pivot away from the lower cam pivot, even to the extent of providing a projection above the arc of the cam, great clamping power is supplied, but little travel of the jaw block. In the drawing, at the position of the toggle shown in full lines in Figure 1, an advantage of approximately 2 to 1 is obtained through the cam.

A single cam, slotted and bored to take a retracting bar, may also be used.

In order to accommodate pipe in a horizontal position when the jaws of the holder are initially in a vertical position as shown in Figures 1, 2 and 3, the jaw plate 21 need only be pulled forward clear of either the housing 22 or 22' against the bias of the spring 23, turned through 90°, and allowed to spring back into the square housing 22 against the plate 20.

It can be seen that if it is desired to accommodate pipe at various angles the housing 22 or 22' and the jaw plate 21 can be made in the form of a suitable symmetrical polygon. For example, an octagon allows the jaw to be moved in increments of 45°, while an equilateral triangle permits only increments of 120°. For general use, of course, a square housing provides all the latitude desired.

In the embodiment of this invention shown in

Figure 5, the yoke 6 is cut off at the cross-bar 17. A retaining collar 40 is secured to the rod 16, which projects a short distance beyond the cross-bar 17. A pair of studs 41, are secured to the rod 16 beyond the cross bar 17. A sleeve 43, encompassing the rod 16 and studs 41 is welded or otherwise secured to the cross-bar 17. A handle 45, in the form of a length of pipe with an inside diameter greater than the diameter of the rod 16 and an outside diameter slightly less than the inside diameter of the sleeve 43, is provided with bayonet slots 46 at one end. The bayonet slots 46 are proportioned to admit the studs 41. Each bayonet slot may take the form of a T-slot rather than the L-slot shown. The operation of the device of this embodiment is the same as the device of Figures 1–4, except that the handle 45 is first inserted in the sleeve 43 in such a way that the studs 41 are engaged by the slots 46, and given a twist to put the studs in the transverse portion thereof. When the handle 45 is raised or depressed, it bears against the inside surface of the sleeve 43. The handle may be removed by twisting it to release the studs from the transverse portion of the slots, and then axially withdrawing the handle.

In Figure 7 is shown a form of jaw block housing 50 which may be used with both the movable and the stationary jaw block, or with either of them. The jaw block housing 50 is an open-ended box which may be welded or otherwise secured to the base plate 3 or which may utilize the base plate as its bottom. A series of oppositely disposed holes 51 are provided along the vertical sides of the jaw block housing. The jaw block housing is proportioned to slidably receive a jaw block. In this embodiment, the stationary jaw block 1 is shown within the jaw block housing and is provided with a single pair of oppositely disposed holes 53 alignable with a selected pair of the holes 51 in the vertical sides of the jaw block housing 50. A pin 55 is inserted through the aligned holes 51 and 53 to hold the jaw block 1 from sliding. Cotter pins or caps, not here shown, may be used to prevent accidental displacement of the pin 55. It can be seen that if a series of holes are provided in the jaw block itself, a relatively fine adjustment can be accomplished even with the stationary jaw block 1. Thus, if the holes 51 are spaced with half inch centers, while four pairs of holes 53 are spaced with ⅜" centers, an adjustment of ⅛" is possible over a range of 1⅞", with a total adjustment of 2⅝". If the four holes 53 are spaced with ¾" centers, an adjustment of ¼" through 2¾", with a total adjustment of 3¾" is possible.

The jaw block housing 50 may also be used in connection with the movable jaw block 2. In that use, the jaw block housing 50 and jaw block 2 need not be provided with holes 51 and 53, though, in order to make for interchangeability, it is entirely satisfactory to make the jaw block housing 50 and the jaw blocks themselves identical for both the stationary and movable jaw blocks. If a vernier arrangement such as has been described is used on the movable jaw block, a pin 55 may be used to fasten that block in pipe-holding position. It can be seen that in connection with the vernier arrangement, a plurality of vertically spaced rows of holes, the holes in each row being staggered with respect to the holes in the remaining rows, can be used to give a fine adjustment without a serious loss of strength.

In the embodiment of jaw block 60 shown in Figures 9–11 the vertical sides 61 of the jaw block depend below the bottom 62 of the block to form guiding skirts 63. A pair of oppositely disposed holes 65 serve as bearings for a cam shaft 67. The cam shaft 67 is provided at one end with an operating handle 68. Near the center of the cam shaft 67 a cam 70 is provided in the form of an eccentrically cut groove through a part of the circumference of the cam shaft. Another pair of additional cam surfaces 69 are provided by eccentrically cut grooves through a portion of the circumference of the cam shaft opposite that portion of the circumference through which the groove of the cam 70 is cut. The cams 69 are positioned along the cam shaft 67 relative to the cam 70 in such a way that when the cam 70 is positioned to engage a plate 75 the cams 69 engage the edges of the holes 65 in the vertical sides 61. Slots 72 and 73 are cut through the top and bottom of the jaw block 60. These slots align with one another vertically and with the cam shaft 67, i. e. a vertical plane containing the axis of shaft 67 will intersect slots 72 and 73. The plate 75 has a relatively narrow and threaded upper portion 76 extending through the slot 72, and at its lower end extends through the slot 73 and beyond the bottom 62 of the jaw block 60. A hole 79 in the plate 75 is positioned to be aligned with holes 65 in the vertical sides 61. Fixed to the bottom of the plate 75 is a locking lug 76 beneath which is secured a stop 77. In this embodiment the base plate is either made narrow and provided with a mortise slot 78, or a separate plate of the appropriate width and provided with a mortise slot 78 is welded over a wider slot in the base plate. In either event, a horizontal plate 80 is provided over the sides of which the skirt 63 fits slidably. The mortise slot 78 is so constructed that the locking lug 76 can fit in the widened portions thereof, while the plate 75 passes through the narrow sections thereof. In the illustration a nut 82 is shown as screwed down upon the threaded end 76 of the plate 75. In assembling the jaw block of this embodiment the block is first placed upon the horizontal plate 80. The plate 75 is inserted, small end first from below the plate 80, through the mortise slot 78, through the slot 73 and, the small end 76, through the slot 72. The cam shaft 67 is inserted through one of the holes 65, through the hole 79 in the plate 75, and through the remaining hole 65 on the opposite side of the jaw block 60.

The nut 82 need not be put on the threaded end 76, and, in fact, is preferably used only when the jaw block is to be fixed in a more or less permanent position.

In the operation of the jaw block of the embodiment shown in Figures 9–12, the handle 68 of the cam shaft 67 is first turned so that the ungrooved surface of the cam 70 bears on the lower edge of the hole 79, at which time the grooved sections of the cams 69 bear on the lower edges of the holes 65. In this position, the plate 75 is forced downwardly far enough to bring the locking lug 76 below the lower surface of the horizontal plate 80, to allow the jaw block to be slid along the plate 80 and mortise slot 78 as far as the plate 75 will allow. To anchor the jaw block, it is only necessary to turn the handle 82 through 180°, while the locking lug 76 is positioned directly beneath an enlarged part of the mortise slot 78. The ungrooved portion of the cam 70 will then engage the upper edge of the hole 79, while the ungrooved portions of the cams 69 will engage the lower edges of the holes 65 and thus force the plate 75 upwardly, lifting the locking lug 76 into the enlarged part of the mortise slot 78 at which it was positioned, until the stop 77 engages the underside of the horizontal plate 80. It can be seen that in this embodiment, which may quickly and easily be manipulated, the amount of adjustment is dependent upon the construction of the mortise slot 78, locking lug 76 and plate 75 and that, generally speaking, the fineness of adjustment of which the vernier type arrangement described heretofore is capable is not possible. When a more or less permanent positioning of the jaw block is desired, the nut 82 may be screwed down tight, immobilizing the plate 75 and the cam shaft 67 as shown in Figures 9 and 10.

Numerous other variations within the scope of the foregoing disclosure and accompanying claims will be apparent to those skilled in the art in the light of the description and accompanying drawing.

Thus it can be seen that a pipe holder is provided which is simple, sturdy, powerful, easily adjustable, quick-acting to both clamp and release, and positively retracted; which can be used with pipe in a variety of positions; and the clamping power of which is unaffected by a tendency of the pipe to rotate.

Having thus described my invention what is claimed and desired to be secured by letters patent is:

1. A pipe holder comprising a fixed jaw block and a movable jaw block, said movable jaw block being urged toward said fixed jaw block by a cam engaging said movable jaw block and rotated about a fixed pivot by a toggle having a yoke pivoted on said cam and a link pivoted on said yoke and on a fixed pivot, the pivot point of said link on said yoke being adjustable longitudinally of said yoke.

2. A pipe holder comprising a fixed jaw block and a movable jaw block, said movable jaw block being urged toward said fixed jaw block by a cam engaging said movable jaw block and rotated about a fixed pivot by a toggle having a yoke pivoted on said cam and a link pivoted on a sliding block carried by said yoke and on a fixed pivot, said yoke carrying said toggle over center when at the limit of its travel toward its jaw clamping position.

3. A pipe holder comprising a base plate, a fixed jaw block fastened to said base plate, a movable jaw block slideably mounted on said base plate, a pair of cams pivoted for rotation on lugs fixed to said base plate and pivoted to a yoke, a pair of links pivoted at one end on ears fixed to said base plate and at their other end on a sliding block carried by said yoke, said sliding block being tapped, a threaded rod journaled in said yoke, maintained against axial movement and taking into said sliding block, and a retracting bar carried by said cams and connected to said movable jaw block.

4. A pipe holder of the character described in claim 3 in which said movable jaw block comprises a regular polygonal open-ended housing, a jaw-carrying plate proportioned to fit slideably but closely within said housing, a stop within said housing to limit the distance to which said jaw-carrying plate can enter said housing, means biasing said jaw-carrying plate toward said stop, and a cam-engaging back plate secured to the end of said housing away from said jaw plate.

5. A pipe holder of the character described in claim 3 in which said movable jaw block and said fixed jaw block each comprise a regular polygonal open-ended housing, a jaw-carrying plate proportioned to fit slideably but closely within said housing, a stop within said housing to limit the distance to which said jaw-carrying plate can enter said housing, and means biasing said jaw-carrying plate toward said stop.

6. A pipe holder of the character described having a fixed jaw block and a movable jaw block, said movable jaw block being urged toward said fixed jaw block by a cam engaging said movable jaw block and rotated about a fixed pivot by a toggle, said movable jaw block comprising a regular polygonal open-ended housing, a jaw-carrying plate proportioned to fit slideably but closely within said housing, a stop within said housing to limit the distance to which said jaw-carrying plate can enter said housing, means biasing said jaw-carrying plate toward said stop, and a cam-engaging back plate secured to the end of said housing away from said plate.

References Cited in the file of this patent

UNITED STATES PATENTS

| Number | Name | Date |
|---|---|---|
| 170,319 | Weaver | Nov. 23, 1875 |
| 372,080 | Mitchell | Oct. 25, 1887 |
| 446,348 | Hathaway | Feb. 10, 1891 |
| 469,815 | Honscheid | Mar. 1, 1892 |
| 713,189 | Yates | Nov. 11, 1902 |
| 923,323 | Bridges | June 1, 1909 |
| 985,807 | Hertlein | Mar. 7, 1911 |
| 1,018,630 | Reeder | Feb. 27, 1912 |
| 1,058,625 | Pepper | Apr. 8, 1913 |
| 1,083,607 | Flora et al. | Jan. 6, 1914 |
| 1,458,619 | Ehrenfeuchter | June 12, 1923 |
| 1,567,192 | Richardson | Dec. 29, 1925 |
| 2,086,400 | Brenizer | July 6, 1937 |
| 2,174,947 | Ramsey | Oct. 3, 1939 |
| 2,360,091 | Wing | Oct. 10, 1944 |
| 2,465,679 | Fleury et al. | Mar. 29, 1949 |
| 2,566,072 | Snell | Aug. 28, 1951 |
| 2,618,188 | Emmett | Nov. 18, 1952 |